United States Patent [19]

Rasor et al.

[11] Patent Number: 6,100,621
[45] Date of Patent: Aug. 8, 2000

[54] THERMIONIC CONVERTER WITH DIFFERENTIALLY HEATED CESIUM-OXYGEN SOURCE AND METHOD OF OPERATION

[75] Inventors: Ned S. Rasor, Cupertino, Calif.; David R. Riley, West Newton, Pa.; Christopher S. Murray, Bethel Park, Pa.; Clint B. Geller, Pittsburgh, Pa.

[73] Assignee: The United States of America as represented by the United States Department of Energy, Washington, D.C.

[21] Appl. No.: 09/047,927

[22] Filed: Mar. 26, 1998

Related U.S. Application Data
[60] Provisional application No. 60/041,887, Apr. 2, 1997.

[51] Int. Cl.[7] .............................. H02N 3/00; H01J 45/00
[52] U.S. Cl. ............................................................ 310/306
[58] Field of Search .................................... 310/306, 301, 310/304, 305; 136/200, 202, 205, 207; 313/346 R

[56] References Cited

U.S. PATENT DOCUMENTS

| 2,975,320 | 3/1961 | Knauer | 310/306 |
| 3,452,224 | 6/1969 | Hernqvist et al. | 310/306 |
| 3,843,896 | 10/1974 | Rason et al. | 310/4 |
| 3,899,696 | 8/1975 | Fletcher et al. | 310/4 |
| 4,298,798 | 11/1981 | Huffman | 250/423 R |
| 4,417,173 | 11/1983 | Tuck et al. | 313/346 R |
| 4,667,126 | 5/1987 | Fitzpatrick | 310/306 |
| 5,566,751 | 10/1996 | Anderson et al. | 165/104.27 |

OTHER PUBLICATIONS

Thermionic Energy Conversion, vol. 1; Hatsopoulos and Gyftopoulos, p. 187, Apr. 1973.
Summary Report Advanced Thermionic Technology Program Part C, Dec. 1983, Rasor Associates Inc.
Advanced Thermionic Energy Conversion, Jul.–Sep. 1979, Rasor Associates, Inc.

Primary Examiner—Nestor Ramirez
Assistant Examiner—Karl Eizo Tamai
Attorney, Agent, or Firm—William R. Moser; Paul A. Gottlieb

[57] ABSTRACT

A thermionic converter having an emitter, a collector, and a source of cesium vapor is provided wherein the source of cesium vapor is differentially heated so that said source has a hotter end and a cooler end, with cesium vapor evaporating from said hotter end into the space between the emitter and the collector and with cesium vapor condensing at said cooler end. The condensed cesium vapor migrates through a porous element from the cooler end to the hotter end.

19 Claims, 4 Drawing Sheets

THERMIONIC CONVERTER WITH DIFFERENTIALLY HEATED CESIUM-OXYGEN SOURCE AND METHOD OF OPERATION

This application claims benefit of the filing date of provisional application serial no. 60/041,887, filed Apr. 2, 1997.

This invention was made under a contract with the U.S. Department of Energy.

BACKGROUND

Thermionic energy conversion is based on the direct emission, or "boiling off," of electrons from a heated metal surface (2700–3000° F.), called the emitter. The electrons from this emitter traverse a small, cesium vapor-filled gap and pass into a colder metal surface (600–1000° F.), called the collector. The collector is connected to an external load where electrical work is performed. The amount of energy available to perform electrical work, and the efficiency with which it can be performed, are increased substantially by incorporating controlled levels of oxygen into the converter's cesium atmosphere. Then a $Cs_2O$—Cs solution provides a source of cesium and oxygen. The invention confronts the challenging engineering problem of controlling and maintaining the dynamic equilibrium of liquid cesium-oxygen mixtures in the converter.

SUMMARY OF THE INVENTION

Cesium vapor is provided to the interelectrode gap of a thermionic converter, and the dynamic two-phase cesium-oxygen equilibrium is maintained through the invention of a differentially heated reservoir integral to the converter. Accordingly, the invention comprises a thermionic converter having an emitter, a collector, and a source of cesium and oxygen vapor, said source of cesium and oxygen vapor being differentially heated so that said source has a hotter end and a cooler end, with cesium vapor evaporating from said hotter end into the space between the emitter and the collector and with cesium vapor condensing at said cooler end, the condensed cesium vapor migrating from said cooler end to said hotter end. Said source of cesium and oxygen vapor is preferably a shaped porous material within an open container, such as a cup, wherein the porous material is differentially heated, with said hotter end being free and exposed to converter atmosphere and said cooler end being within said open container, and preferably in contact with it. The porous material may be in the shape of a pellet, formed by compressing particulate material.

DETAILED DESCRIPTION OF THE INVENTION

Figure 1:
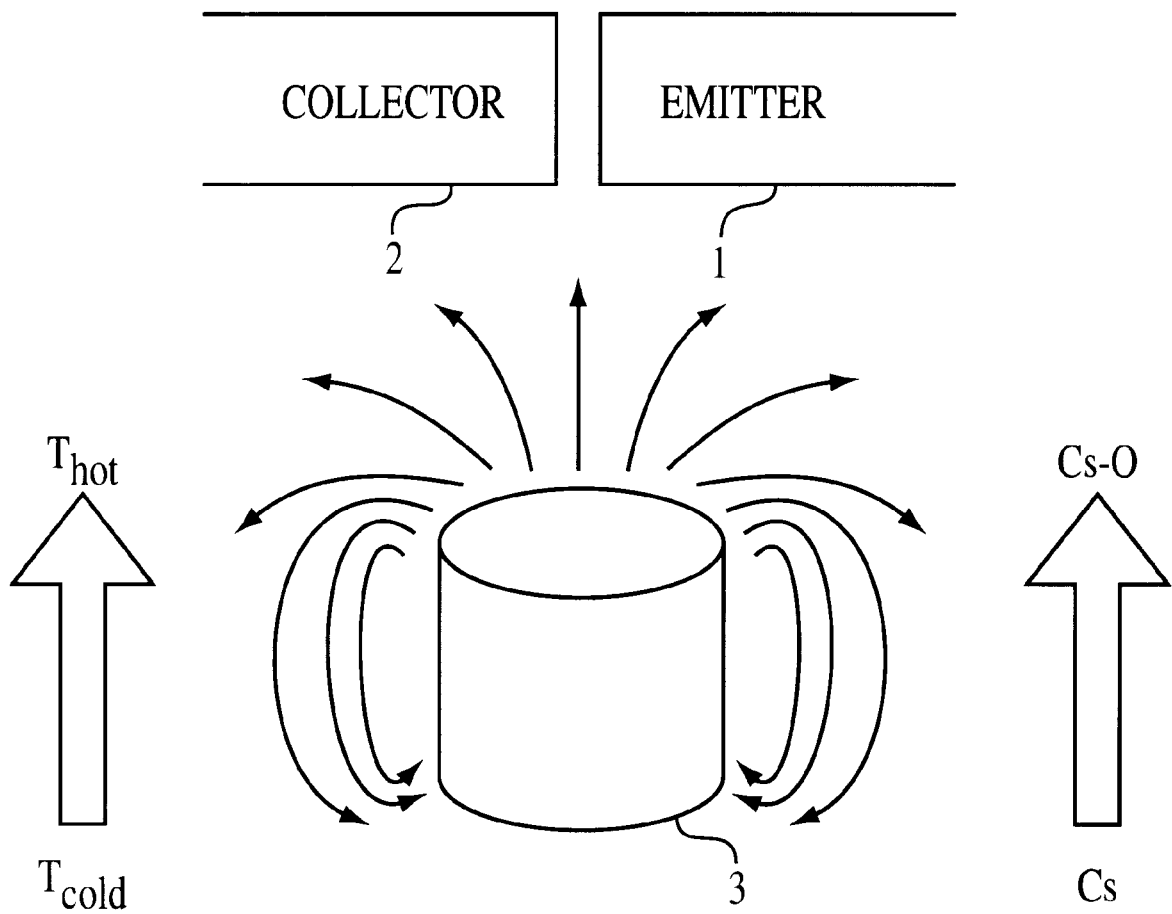
FIG. 1 is a schematic drawing of a thermionic converter using a differentially heated permeable element as a source of cesium and oxygen vapor.

As shown in FIG. 1, a planar test converter consisting of an emitter (1), a collector (2), a cesium/oxygen source (3), and a vacuum system may be used for converter investigations. The emitter, collector, and cesium/ oxygen source are located in a chamber which is evacuated by the vacuum system. A permeable reservoir is used as a source of cesium and oxygen. The reservoir may consist of a porous "compact" or "pellet" made of a porous material containing oxygen that is capable of withstanding exposure to liquid cesium as described below. The compact is within an open container such as a cup. When cesium is distilled into the reservoir cup containing the porous compact, cesium is drawn into the interior volume of the compact via capillary action and surface wetting forces. In a preferred embodiment the metal compact is differentially heated such that the top end, which is unconnected to any other structure, is the hottest point in the compact, and the bottom end, which is in contact with the reservoir cup, is the coldest point. The compact may be heated with heat emanating from the region of the emitter and collector or by any other covenient means. The liquid cesium reduces the oxide on the internal surfaces of the compact and absorbs oxygen into solution. The equilibrium vapor pressure of cesium above the hot end of the compact is higher than at the cold end, resulting in an evaporation/condensation cycle in the chamber enclosing the reservoir; cesium condenses from the atmosphere at the bottom end of the compact, and wicks up through the compact to the top, where it evaporates. If there is excess cesium present, it may wet the bottom of the reservoir cup. If a lesser amount of cesium is present, it will all be absorbed by the compact. The converter will work in either case.

The source of cesium and oxygen vapor is a permeable, porous solid structure comprised of a metal, metal oxide, or ceramic with interconnected porosity. The structure may be made by compacting metal particles, sintering, use of binder, or other metallographic techniques. A ceramic structure may be made by firing a ceramic precursor material. A preferred permeable solid structure is comprised of porous nickel oxide.

The liquid cesium in the converter picks up oxygen from the oxygen source provided within the reservoir. The oxygen-bearing liquid cesium migrates up the pores of the permeable, solid structure (referred to herein as a "compact" or "pellet") from the colder to the hotter end where it evaporates, yielding cesium vapor and gaseous $Cs_xO_y$ species which go into the space between the emitter and the collector of the thermionic converter.

The emitter and collector are made of refractory metal or metal alloy. Such metals have high bare work functions. They include, preferably, molybdenum, tungsten, niobium, rhenium, and tantalum, and less commonly, osmium and iridium. A test converter was constructed and operated as described above. The partial pressure of cesium was approximately eight orders of magnitude higher than that of the cesium oxides present, under the experimental conditions chosen, even though portions of the liquid cesium/oxygen mixture within the pores of the compact contained at least several atomic percent oxygen. Consequently, the cesium evaporation/ condensation cycle causes oxygen entrained in the flowing cesium to accumulate at the hot end due to the preferential evaporation of cesium. The hotter, oxygen-rich top end of the metal compact supplies the cesium oxide vapors that control converter performance.

Differentially heated porous metal compacts have several advantages over all previously tested methods for supplying mixed cesium/cesium oxide vapors to thermionic converters:

1) Bulk liquid cesium/oxygen mixtures will migrate up temperature gradients, and away from the cold spot in which the cesium must originally be placed. Furthermore, oxygen will segregate within the migrating mixture to the hottest point. In previous experiments using different cesium-oxygen source configurations, experimental control and performance stability was always lost in the face of this migration and segregation process. Cesium-oxygen migration, and the compositional segregation that results, is also a prime contributor to performance instability and irreproducibility in the reported results of other research groups with cesium-oxygen thermionic devices. The porous metal compacts effectively confine the liquid migration process to the internal volume of the compact via capillary attraction, allowing long-term performance stability.

2) Cesium/oxygen compositional segregation is necessary to obtain optimum cesium and cesium oxide partial pressures in the interelectrode space simultaneously. The differentially heated porous compact configuration described herein provides a means of naturally establishing and maintaining a stable chemical composition gradient with the desired properties within the vapor source. Modest changes in oxygen loading merely cause the location of the cesium/cesium oxide phase boundary to move, without effecting first order changes in the cesium or cesium oxide vapor pressures.

It is noted that deliberately establishing a local temperature maximum within a thermionic converter reservoir runs contrary to the established practice for cesium-only converters. Based on the phenomenology of pure cesium liquid, conventional cesiated thermionic converters are always designed such that the reservoir is the coldest point within the cesium envelope! The concept of the invention is therefore counterintuitive in view of the prior art, and thus was unlikely to have been devised by anyone unfamiliar with the migration and segregation phenomena discovered by the inventors.

3) The evaporation/condensation cycle caused within the thermionic converter by the vapor source sweeps impurities out of the interelectrode space and into the reservoir, representing a self-cleaning mechanism operating within the converter. The mass transport cycle will also consume any competing cesium or oxygen sources in the converter over time, contributing to performance stability.

4) Preplacement of the oxygen charge within the porous compact prior to cesiation promotes complete and intimate initial mixing of the available oxygen with the cesium. This is important because oxygen loading methods which result in significant fractions of the starting oxygen inventory elsewhere in the converter can cause a partial or complete loss of experimental control, due to the low oxide partial pressures and the correspondingly long equilibration times for oxide transport.

Figure 2:
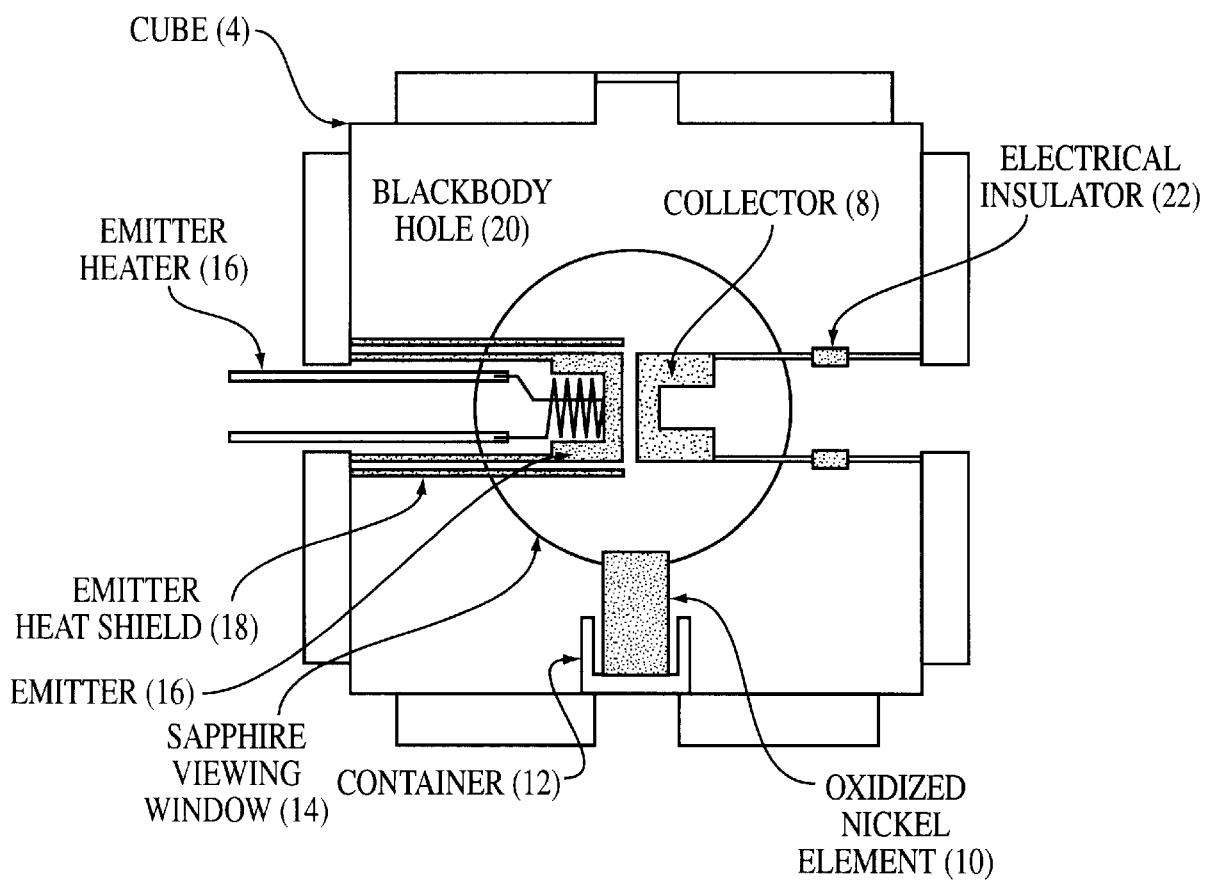
FIG. 2 is a schematic drawing of a cube thermionic converter showing the container for the permeable element and the heater for the emitter.

A series of thermionic converter experiments were performed in a physical understanding experimental (PUE)cube that consisted of an emitter with a chemically vapor deposited (CVD) coating of tungsten on a molybdenum substrate, an electropolished molybdenum collector, a reservoir cup (i.e., container) for holding the cesium-oxygen charge and a sapphire viewing window. FIG. 2 is a schematic of the PUE cube (4) used for performance enhancement resulting from a porous, oxidized metal compact. The emitter (6) and collector (8) were attached to the cube with surfaces parallel at a gap spacing of 27 mils (this corresponded to the closest possible proximity physically attainable for this emitter-collector pair). The cesium/oxygen reservoir, a porous oxidized nickel element (10), was placed in container (12) below the emitter-collector pair to provide line-of-sight vapor transport to the interelectrode gap. The sapphire window (14) was oriented on the cube to permit visual inspection of the inside of the converter assembly during operation, and verification of the emitter temperature with an optical pyrometer. Visual observations of the nickel compact and reservoir cup also served to confirm the containment of the cesium-oxygen charge within the reservoir throughout the experiment. The emitter was heated with an electrical resistance heater (16) and was contained within a heat shield (18). A hole (20) for blackbody radiation was provided in the emitter adjacent to the collector. Electrical connections to the collector were protected by an electrical insulator (22).

A differentially heated porous metal compact was invented to control compositional segregation, migration and chemical mixing phenomena. The compact must have the following characteristics:

1) It must have low density, but must maintain sufficient mechanical integrity,
2) It must be chemically compatible with cesium-oxygen solutions,
3) It must provide an effective wetting surface for cesium-oxygen mixtures,
4) It must have low thermal conductivity, to provide a temperature gradient, and across the compact,
5) It must maintain dimensional stability and a stable pore structure in service.

As indicated above, platinum black was initially chosen as the compact material since it could be prepared from extremely fine, 300 Angstrom particles with large surface area (93.2 m$^2$/g) and because of its known ability to control the migration of alkali metal sulphide mixtures in evaporation experiments previously reported in the literature. However, it was dimensionally unstable and sintered during converter operation. Because the internal surface area of the platinum compact changed over time, the oxygen loading could not be controlled accurately. Several alternative materials consequently were investigated as potential reservoir structures. Porous yttria, alumina, scandia, molybdenum and nickel were tested. The three ceramics (yttria, alumina and scandia) became discolored and embrittled in the presence of liquid cesium, while the two metal materials (molybdenum and nickel) maintained their structural integrity. Porous nickel was selected because it has a thermal conductivity compatible with maintaining a thermal gradient in the compact, and because its ternary cesium oxygen compounds are not as volatile as cesium molybdate, suggesting that nickel would be less reactive than molybdenum, and structurally robust.

A 23.5% dense (geometric density) porous nickel sample was fabricated. Microstructural analysis indicated that the nickel sample had bimodal porosity with approximately 50 to 100 $\mu$m interconnected pores and approximately 1 to 3 $\mu$m holes. Energy dispersive X-ray spectroscopy indicated no metal impurities in the nickel. Following characterization, the 0.35" diameter×0.40" height porous nickel sample was annealed in a reducing atmosphere under 2 psi of argon/3% hydrogen at 930° F. for 30 minutes. To provide a source of oxygen for the cesium, a film of nickle oxide then was grown on the surface of the nickel, as related in Equation 1:

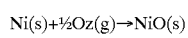

The nickel pellet was oxidized under argon/4% oxygen at 400° C. for 45 minutes. Thermogravimetric analysis (TGA) indicated this level of oxidation corresponded to six atomic percent oxygen for 0.5 grams of cesium, assuming that 100% of the oxide film was reduced by the cesium during converter operation as shown in Equation 2:

$$NiO(s) + 2Cs(l) \rightarrow Cs_2O(l) + Ni(s)$$

The formation energy of NiO is 20 Kcal greater than $Cs_2O$ at 525° F.; therefore, there is a significant thermodynamic driving force for cesium to reduce NiO to Ni forming the respective cesium oxide compounds.

A quantity of 0.5 grams of cesium was distilled from the external cesium reservoir into the internal cesium reservoir. During this cesium transfer, the temperature of the emitter was 1070° F., that of the collector was 620° F., that of the external cesium reservoir was 440° F. and that of the internal cesium reservoir was 275° F. (this ensured the internal cesium reservoir was the coldest spot in the system). Once 0.5 gram was transferred, the cube was isolated from the rest of the system. By visual inspection it could be seen that the distilled cesium had condensed in the internal cesium reservoir.

Converter Results Using Oxidized Nickel Reservoir

Figure 3:
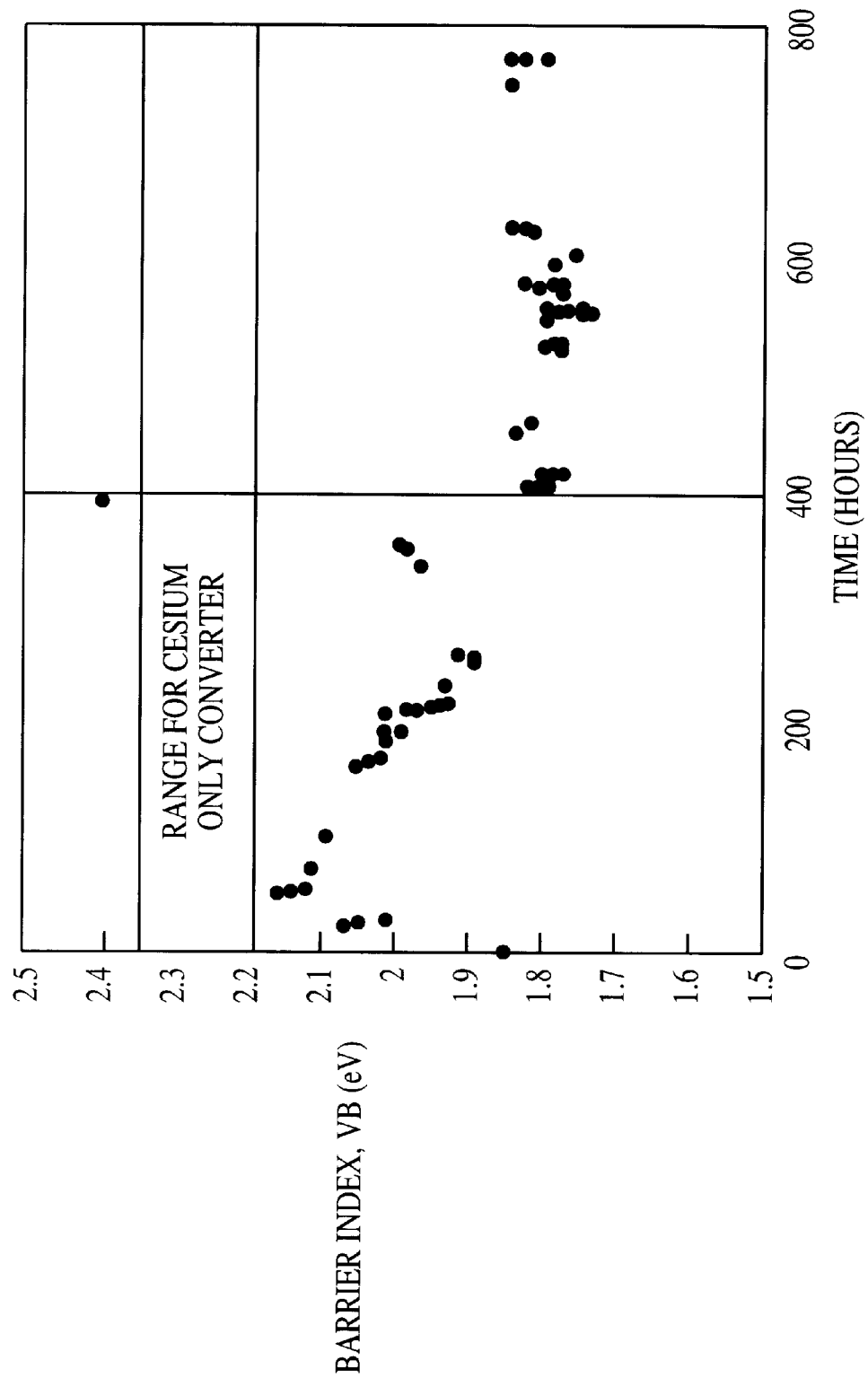
FIG. 3 shows the barrier index versus time for two different periods of operation of the converter.

A key scientific issue in past experiments was the inability to obtain stable oxygenated converter performance when using cesium/oxygen sources. Typical oxygenated converter performance would be stable for only a few hours or days followed by a steady decrease in performance towards that of cesium-only converters. A figure of merit widely used to compare converter performance is the barrier index, which is the sum of the arc drop and the collector work function; a decrease in barrier index indicates an increase in converter performance. The barrier index versus time for two different periods of operation of the converter is shown in FIG. 3, at an emitter temperature of 2780° F., a collector temperature of 980° F., and a cesium/oxygen reservoir temperature of 490° F. (measured at the bottom of the compact). Differential heating of the compact was accomplished with radiant heat from the emitter and collector and with an external heater on the reservoir cup; the thermocouple used to measure the cesium reservoir temperature was located at the base of the reservoir cup. Each period represents a separate cesium distillation from the external cesium reservoir into the internal cesium reservoir (nickel pellet).

During the first 400-hour experiment, degradation of performance occurred during the first 40 hours of operation with an increase in the barrier index from 1.85 eV to 2.15 eV. After 40 hours, converter performance increased as the barrier index decreased to 1.92 ev at 270 hours of operation. At this time, it is suspected that cesium began leaking from the cube and performance began to decrease, with termination of the experiment at 400 hours. During this period of operation of the converter, residual gas analysis of the cube atmosphere indicated a large carbon monoxide (28 amu) peak of $2\times10^{-5}$ Torr and a slight increase from baseline of the carbon dioxide (44 amu) and methane (16 amu) peaks. It has been reported in the literature that carbon monoxide contamination on the order of $10^{-5}$ Torr can result in increases in the collector work function of 0.29 to 0.3 eV, which during converter operation would be seen as an increase in barrier index.

After the first cesium distillation experiments were terminated, vigorous efforts were taken to reduce the amount of gaseous impurities in the system. To meet this end, additional bakeout of the cube components (i.e., emitter, collector, etc.), valving pipeline and vacuum plumbing were performed. Mass spectroscopy experiments were carried out on the gases evolving from these hardware components as they were heated to remove impurity gases (i.e., hydrogen, carbon monoxide, carbon dioxide, oxygen and methane). After 400 hours of bakeout, the partial pressures of the suspected contaminants were all below $10^{-8}$ Torr.

Figure 4:
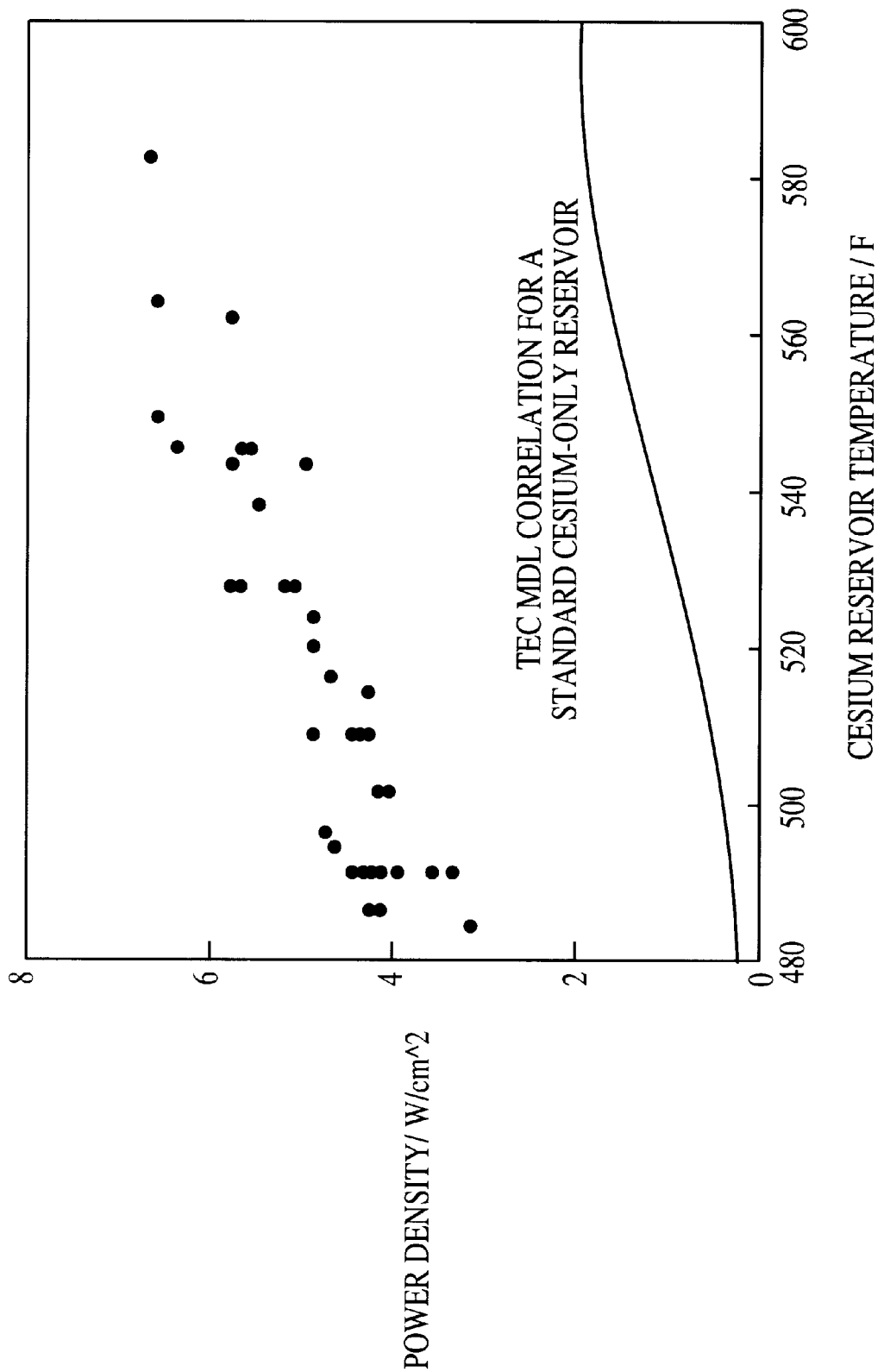
FIG. 4 is a plot of power density in watts per square centimeter versus cesium reservoir temperature in degrees Fahrenheit.

Cesium was then distilled into the nickel pellet, and the converter operated for another 360 hours. Testing following this second cesium distillation was terminated due to slippage of the emitter heat shield; however, stable oxygenated performance was observed throughout the entire 360 hours of operation. The power density measured for the operating conditions shown in FIG. 4 was on average 4 $W/cm^2$, resulting in a calculated electrode efficiency of about 18%. However, as the cesium/oxygen reservoir temperature is increased, both the measured power density and calculated electrode efficiency increase as shown in FIG. 4. Also shown in FIG. 4 for comparison are cesium only results using the industry standard computer code "TECMDL". From these and other similar experiments, it is apparent that cesium-oxygen performance is significantly better than that available with cesium only under similar operating conditions. The oxidized nickel pellet provided a stable, reproducible source of oxygen to the cesium and maintained its structural integrity throughout the entire 760 hours of operation. This cesium/oxygen solution migrated to the top of the nickel pellet and evaporated as cesium and oxygen vapor into the interelectrode gap, which resulted in power densities as high as 6.6 $W/cm^2$, barrier indices as low as 1.75 eV, and calculated electrode efficiencies as high as 20% (assuming a conservatively estimated effective electrode pair emissivity of 0.16) for 360 hours of continuous operation. These results were obtained at an emitter temperature of 2780° F., collector temperatures ranging from 980° to 1115° F., and reservoir temperatures ranging from 476° to 585° F. At emitter temperatures greater than 3000° F., of interest for gas-fired power topping cycles and advanced nuclear applications, power densities exceeded 10 $W/cm^2$.

The development of a stable, high performance oxygenated cesium thermionic converter thus has been demonstrated. Using the invention of a porous, oxidized metal compact, enhanced, stable performance was increased relative to conventional converter performance from 0.9 $W/cm^2$ to 6.6 $W/cm^2$ in power density, and from 7.6% to 20.5% in thermal efficiency. This work is expected to substantially expand the application of thermionic conversion technology for a host of uses, including power topping cycles and terrestrial cogeneration for industrial processes (aluminum refining, petrochemical processing, chlor-alkali processing, etc). The traditional, unique advantages of thermionics for space power applications also are enhanced, making nuclear thermionic technology the clear choice for future generations of high power ($\geq 100$ kW) satellites.

Therefore, we claim:

1. A thermionic converter having an emitter, a collector, and a source of cesium vapor, said source of cesium vapor being a porous solid comprised of oxidized nickel capable of containing liquid cesium and being differentially heated so that said source has a hotter end and a cooler end, with cesium vapor evaporating from said hotter end into the space between the emitter and the collector and with cesium vapor condensing at said cooler end, the condensed cesium vapor migrating from said cooler end to said hotter end.

2. A thermionic converter of claim 1, wherein said porous solid is contained within in a reservoir cup having a heater for heating said cup to at least the melting temperature of cesium but less than the temperature of the hotter end of said porous solid.

3. A thermionic converter of claim 1, wherein said emitter and said collector are comprised of refractory metal or refractory metal alloy.

4. A thermionic converter of claim 3, wherein said emitter is tungsten on a molybdenum substrate and said collector is molybdenum.

5. A thermionic converter of claim 3, wherein said refractory metal or metal alloy is comprised of a metal selected from the group consisting of molybdenum, tungsten, niobium, rhenium, and tantalum.

6. A thermionic converter of claim 5 wherein said porous solid is formed by oxidizing an approximately 23.5% dense porous nickel pellet with interconnected pores of approximately 50 to 100 micrometers in diameter.

7. A thermionic converter of claim 1, wherein the cesium picks up oxygen as the cesium circulates through the converter, resulting in the production of cesium vapor and oxygen vapor at the hotter end of said porous solid.

8. A thermionic converter of claim 1, wherein the hotter end of said source of cesium vapor is free and exposed to the converter atmosphere.

9. In a thermionic converter having an emitter, a collector, and cesium as a working fluid, the improvement comprising a differentially heated permeable element comprised of oxidized nickel having a hotter end and a cooler end, such that cesium vapor can evaporate from said hotter end into the space between the emitter and the collector, cesium vapor can condense at said cooler end, and condensed cesium vapor at said cooler end can migrate through said permeable element from said cooler end to said hotter end.

10. A converter according to claim 9, wherein the cooler end of said permeable element is in an open container.

11. A converter according to claim 9, wherein said permeable element is a structure with interconnected porosity through which liquid cesium can migrate by capillary action.

12. A converter according to claim 11, wherein said permeable element is formed by oxidizing a porous nickel pellet with interconnected pores of approximately 50 to 100 micrometers in diameter.

13. A converter according to claim 12, wherein said porous nickel pellet is approximately 23.5% dense before oxidation.

14. A converter according to claim 9, wherein the cesium picks up oxygen as the cesium circulates through the converter, resulting in the production of cesium vapor and oxygen vapor at the hotter end of said permeable element.

15. A converter according to claim 9, wherein the hotter end of said permeable element is closer to the emitter and collector than the cooler end of said permeable element and is heated by heat from the region of the emitter and collector.

16. In the process of producing electrical current with a thermionic converter having an emitter, a collector, and a source of cesium vapor, the improvement comprising (1) providing as the source of cesium vapor, a permeable element comprised of oxidized nickel and containing liquid cesium, and (2) heating the end of said permeable element closest to the emitter and collector to a higher temperature than the temperature of the opposite end of said permeable element.

17. The process improvement of claim 16 wherein the cesium picks up oxygen as the cesium circulates through the reservoir, resulting in the production of cesium vapor and oxygen vapor at the hotter end of said permeable element.

18. The process improvement of claim 16 wherein said heating of the end of said permeable element closest to the emitter and collector is carried out with heat emanating from the region of the emitter and collector.

19. In a thermionic converter having an emitter, a collector, and cesium as a working fluid, the improvement comprising a differentially heated permeable element in an open container having a heater, said permeable element having a hotter end and a cooler end, such that cesium vapor can evaporate from said hotter end into the space between the emitter and the collector, cesium vapor can condense at said cooler end, and condensed cesium vapor at said cooler end can migrate through said permeable element from said cooler end to said hotter end, wherein said heater heats said open container to at least the melting temperature of cesium but less than the temperature of of said hotter end of said permeable element.

* * * * *